United States Patent
Wisner et al.

(10) Patent No.: US 8,061,266 B2
(45) Date of Patent: Nov. 22, 2011

(54) FOOD WARMING AND HOLDING DEVICE CONSTRUCTION AND METHOD

(75) Inventors: Donald W. Wisner, Grand Haven, MI (US); Dennis V. Rupar, Spring Lake, MI (US); Terry L. Plumert, Grand Haven, MI (US)

(73) Assignee: Track Corp., Spring Lake, MI (US)

( * ) Notice: Subject to any disclaimer, the term of this patent is extended or adjusted under 35 U.S.C. 154(b) by 423 days.

(21) Appl. No.: 12/040,163

(22) Filed: Feb. 29, 2008

(65) Prior Publication Data

US 2008/0213449 A1   Sep. 4, 2008

Related U.S. Application Data

(60) Provisional application No. 60/892,609, filed on Mar. 2, 2007.

(51) Int. Cl.
*A47J 37/00* (2006.01)
*A47J 39/00* (2006.01)
*H05B 1/02* (2006.01)

(52) U.S. Cl. ............... 99/333; 99/448; 99/468; 99/483; 219/214; 219/395; 219/413

(58) Field of Classification Search ........... 99/326–333, 99/467–479, 483, 444–450; 210/400–401, 210/385–396, 411–414, 492–493; 219/394, 219/395, 392, 385, 386, 389, 214, 413
See application file for complete search history.

(56) References Cited

U.S. PATENT DOCUMENTS

| | | | |
|---|---|---|---|
| 4,210,675 A | 7/1980 | Liebermann | |
| 4,278,697 A | 7/1981 | Liebermann | |
| 5,404,935 A | 4/1995 | Liebermann | |
| 5,724,886 A | 3/1998 | Ewald et al. | |
| 5,900,173 A | 5/1999 | Robards, Jr. | |
| 5,947,012 A | 9/1999 | Ewald et al. | |
| 5,948,301 A | 9/1999 | Liebermann | |
| 5,981,916 A * | 11/1999 | Griffiths et al. | 219/492 |
| 6,119,587 A | 9/2000 | Ewald et al. | |
| 6,209,447 B1 | 4/2001 | Ewald et al. | |
| 6,265,695 B1 | 7/2001 | Liebermann | |
| 6,344,630 B1 * | 2/2002 | Jarvis et al. | 219/386 |
| 6,358,548 B1 | 3/2002 | Ewald et al. | |
| 6,414,278 B1 | 7/2002 | Frohlich et al. | |
| 6,607,766 B2 | 8/2003 | Ewald et al. | |
| 6,637,322 B2 * | 10/2003 | Veltrop | 99/483 |
| 6,658,994 B1 * | 12/2003 | McMillan | 99/468 |
| 6,818,869 B2 * | 11/2004 | Patti et al. | 219/489 |
| 7,105,779 B2 * | 9/2006 | Shei | 219/413 |
| 7,220,946 B2 * | 5/2007 | Majchrzak et al. | 219/401 |
| 7,258,064 B2 * | 8/2007 | Vaseloff et al. | 99/468 |
| 7,328,654 B2 * | 2/2008 | Shei | 99/468 |
| 7,446,282 B2 * | 11/2008 | Shei et al. | 219/391 |

* cited by examiner

*Primary Examiner* — Reginald L Alexander
(74) *Attorney, Agent, or Firm* — Warner Norcross & Judd LLP

(57) ABSTRACT

A device for heating food includes a housing and a plurality of heated shelves or trays supported on the housing. Each tray includes a heater and a temperature sensor. The heater is operable to heat the tray and the temperature sensor is capable of sensing the temperature of the tray. A controller is coupled to each heater and each temperature sensor, and the controller is configured to operate the heater as a function of the tray temperature.

4 Claims, 14 Drawing Sheets

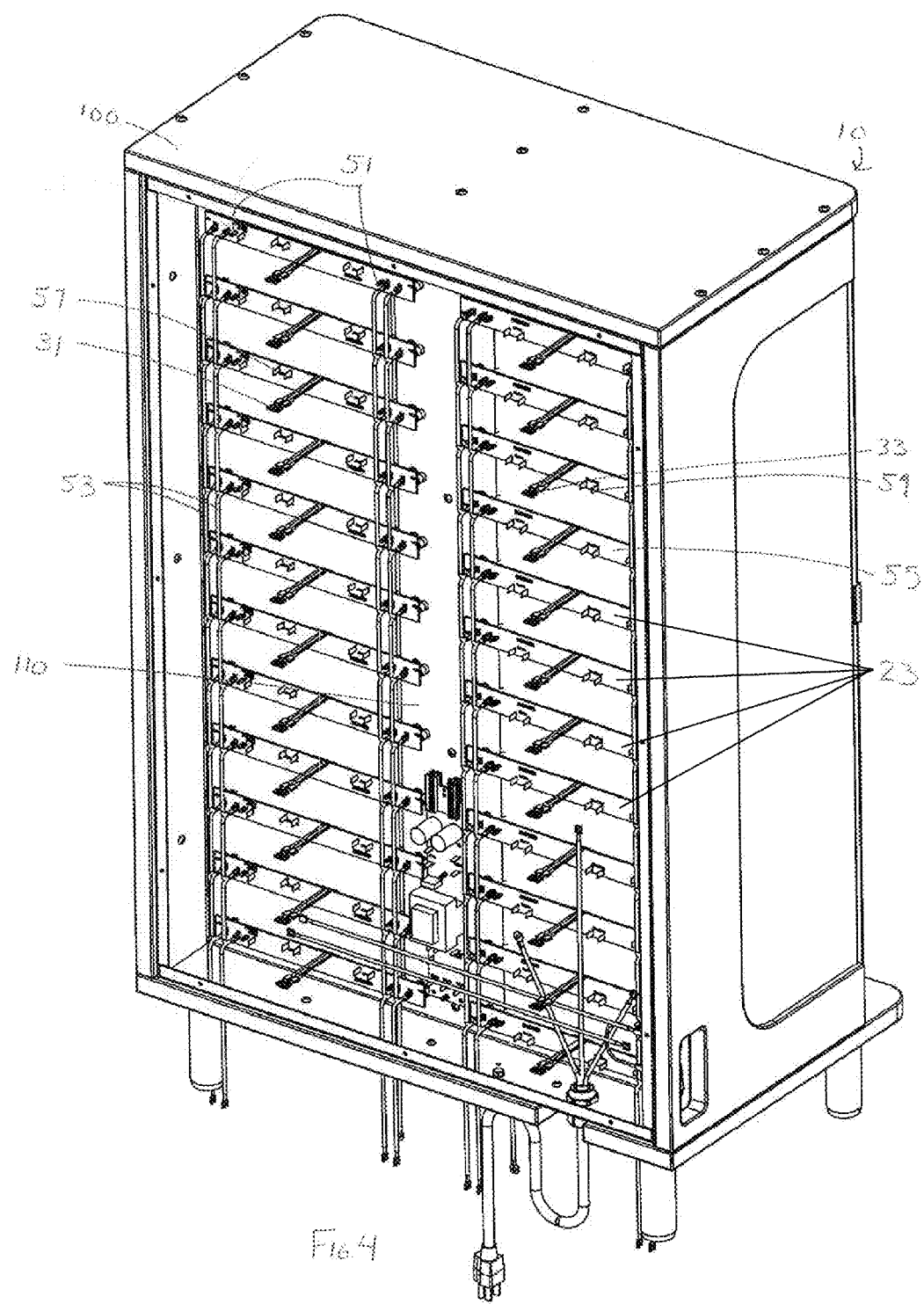

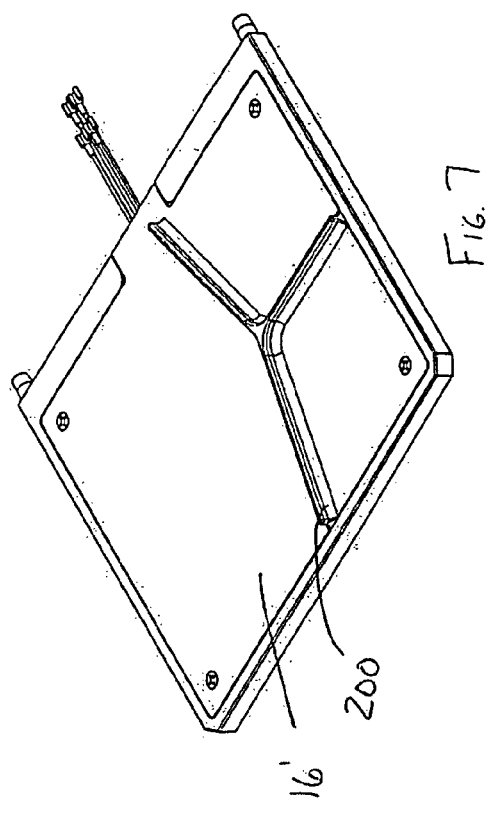
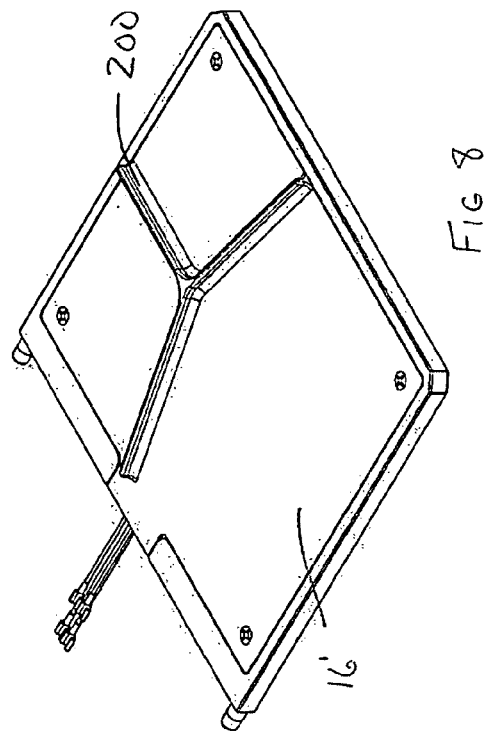
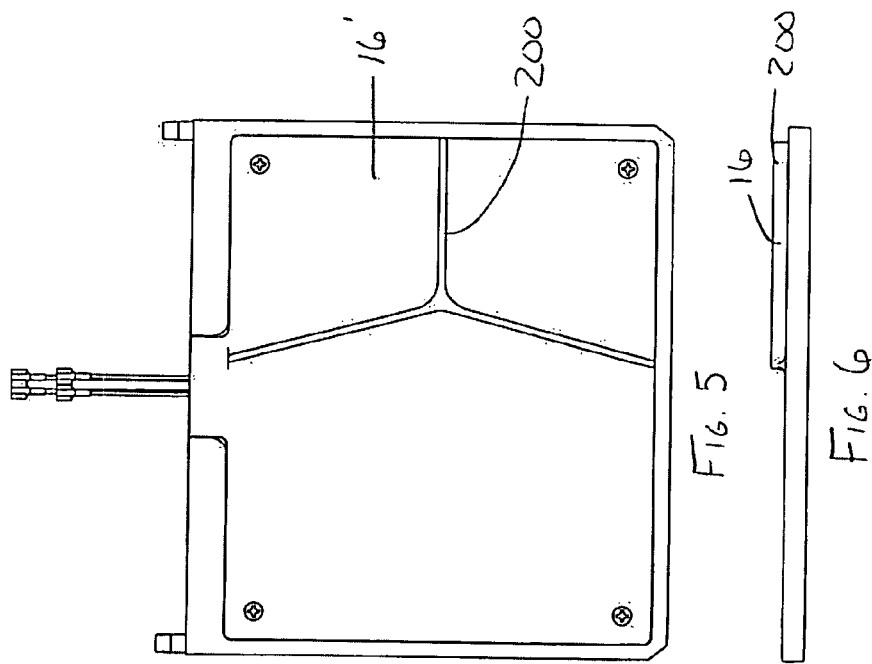

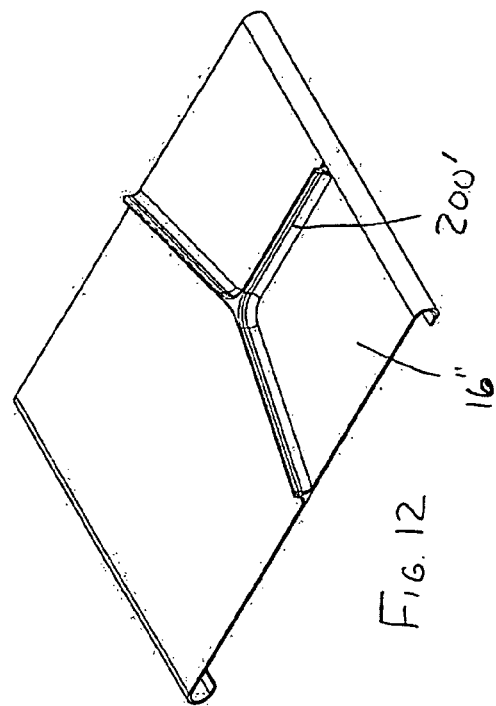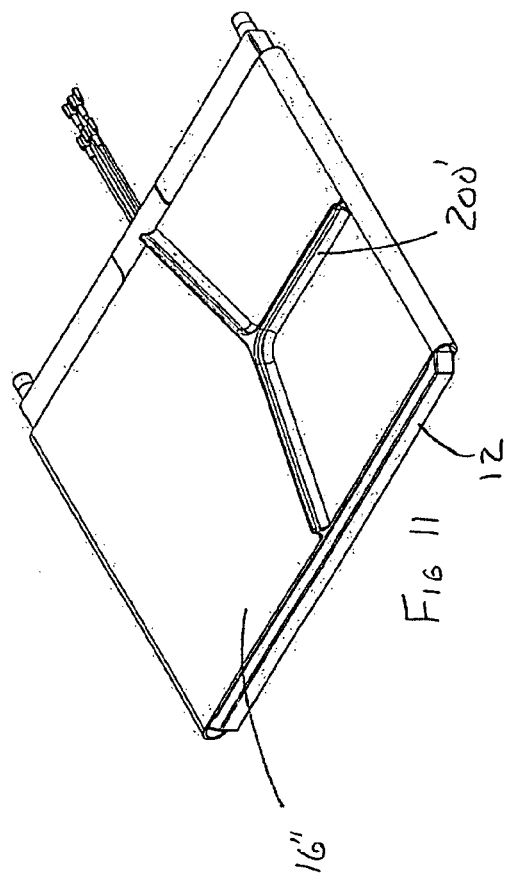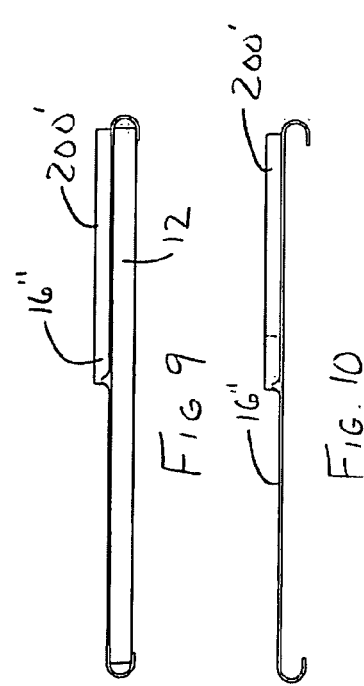

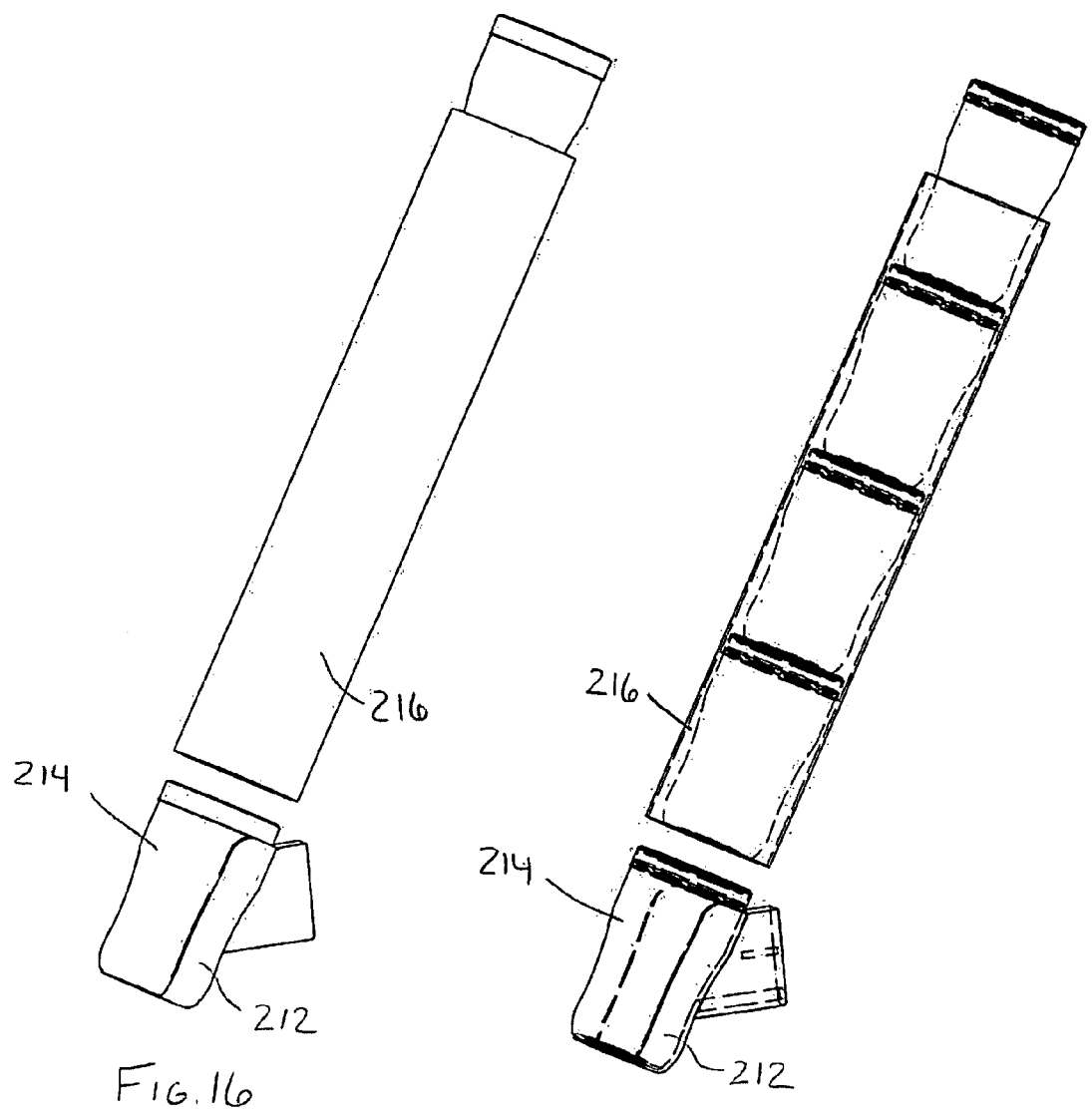

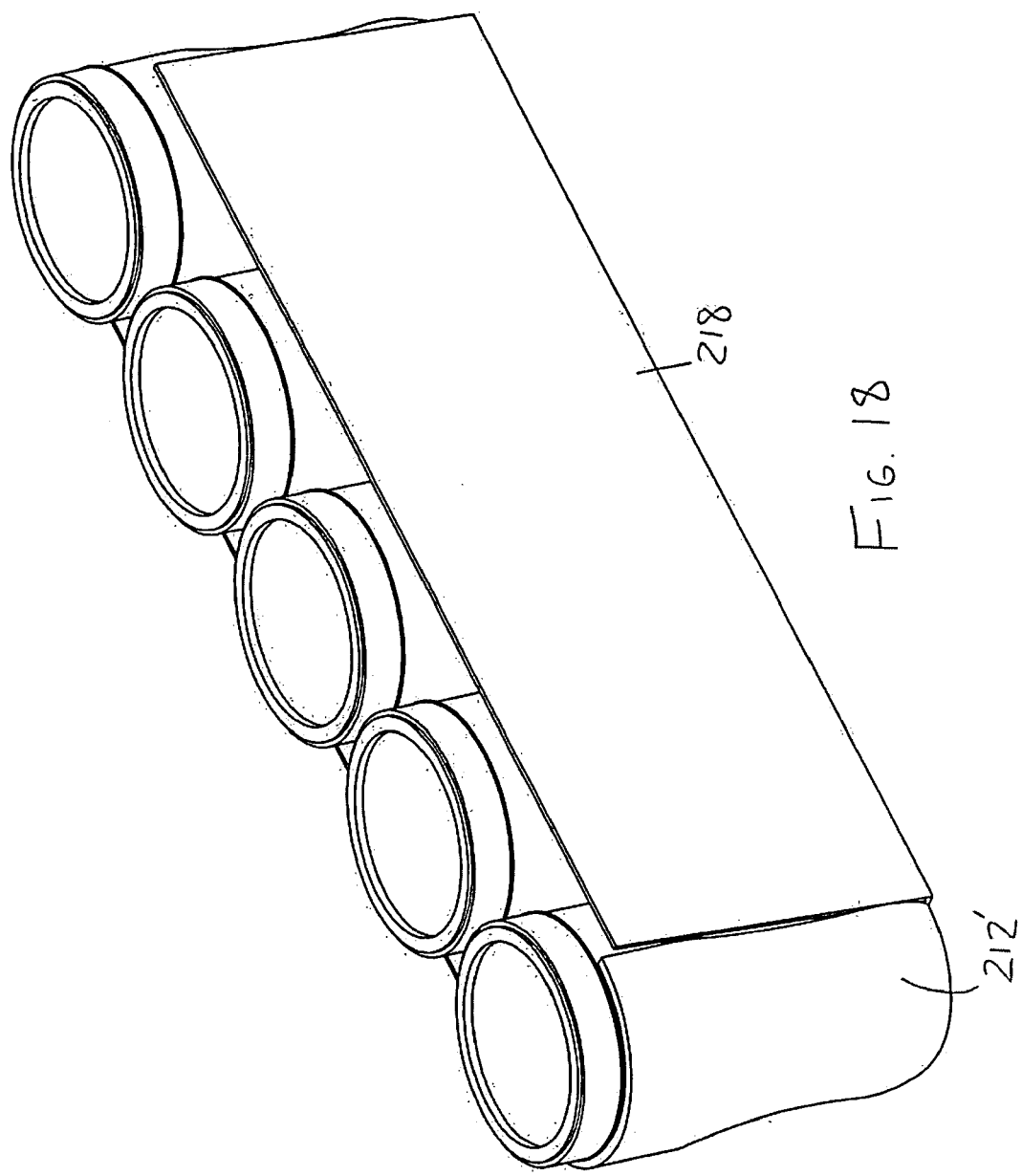

FOOD WARMING AND HOLDING DEVICE CONSTRUCTION AND METHOD

BACKGROUND OF THE INVENTION

Pre-cooked and pre-packaged frozen meals and food items are a popular way to divide large amounts of food products prepared at a given time for final preparation and consumption in smaller individual or group portion sizes at a later time. Such meals typically require heating or warming to a temperature not only comfortable for consumption but also to a pathogenically safe level through conventional means such as the use of an oven, toaster oven, convection oven, microwave or similar device.

These items, however, generally require the product's seal to be broken in the rethermalization process. If the package containing the food's seal is not opened intentionally prior to the process, either due to incompatibility with the process or for other reasons, the vapor pressure within the package generally will become too great for the seal to sustain and break the seal. Either event allows for the food to dry out if held at elevated temperatures for an extended period of time.

SUMMARY OF THE INVENTION

The current invention provides a device for heating food that includes a housing and a plurality of heated shelves or trays supported on the housing. In one embodiment, each of said trays includes a heater and a temperature sensor. The heater is operable to heat the tray and the temperature sensor is capable of sensing the temperature of the tray. The device may further include a controller coupled to each heater and each temperature sensor, wherein the controller is configured to operate the heater as a function of the tray temperature.

In one embodiment, the housing is a cabinet with a rear wall, a pair of side walls, and at least one door. The trays are supported horizontally on the rear wall in cantilever fashion, and are arranged in a column. Each tray may include an upper plate, a lower plate and a frame, with the heater and temperature sensor positioned within the frame and between the plates. In one embodiment, at least a portion of the frame is transparent or translucent, and a light source is positioned adjacent to the frame. The light source can be activated by the controller to signal that the food item has been heated to a desired temperature.

In another embodiment, the controller is configured to heat the tray to a hold temperature, and then hold the tray at or near the hold temperature by operating the heater at a first duty cycle. The controller may be further configured to heat the tray from the hold temperature to a cook temperature when a food product is placed on the tray. In one embodiment, the heater is then operated on a second duty cycle to hold the temperature of the tray at the cook temperature for a desired cook time. The heater may then again operate on the first duty cycle to hold the heated food product at the hold temperature.

The current device can be used to heat and hold one or more pre-packaged cooked food items—without breaking the seal of the package. It can also be used to heat non-packaged food items, such as leftovers, and to hold them at a warmed temperature until the user is ready to consume them. The device can be employed in many different venues and under various conditions, ranging from behind-the-counter applications such as a restaurant, entertainment venue or convenience store settings; to point-of-purchase usage for convenience stores, cafeterias or similar vending locales; and also to home, dormitory, housing unit, care center, office or workplace use.

These and other objects, advantages, and features of the invention will be readily understood and appreciated by reference to the detailed description of the current embodiment and the drawings.

BRIEF DESCRIPTION OF THE DRAWINGS

FIG. 4 is rear perspective view of the cabinet with the rear cover panel removed.

FIG. 5 is a top view of a tray according to an alternative embodiment.

FIG. 6 is a front view of the tray of FIG. 5.

FIG. 7 is a right front perspective view of the tray of FIG. 5.

FIG. 8 is a left front perspective view of the tray of FIG. 5.

FIG. 9 is a front view of a tray with a tray cover attached.

FIG. 10 is a front view of the tray cover.

FIG. 11 is a perspective view of the tray with the tray cover attached.

FIG. 12 is a perspective view of the tray cover.

FIG. 16 is a side view of a vertical feeder and heater according to another embodiment of the present invention.

FIG. 17 is a side view of the vertical feeder and heater of FIG. 16 with food product containers shown in broken lines.

FIG. 18 is a perspective view of a feeder and heater according another embodiment of the present invention.

DETAILED DESCRIPTION OF THE CURRENT EMBODIMENT

I. Overview

Figure 1:
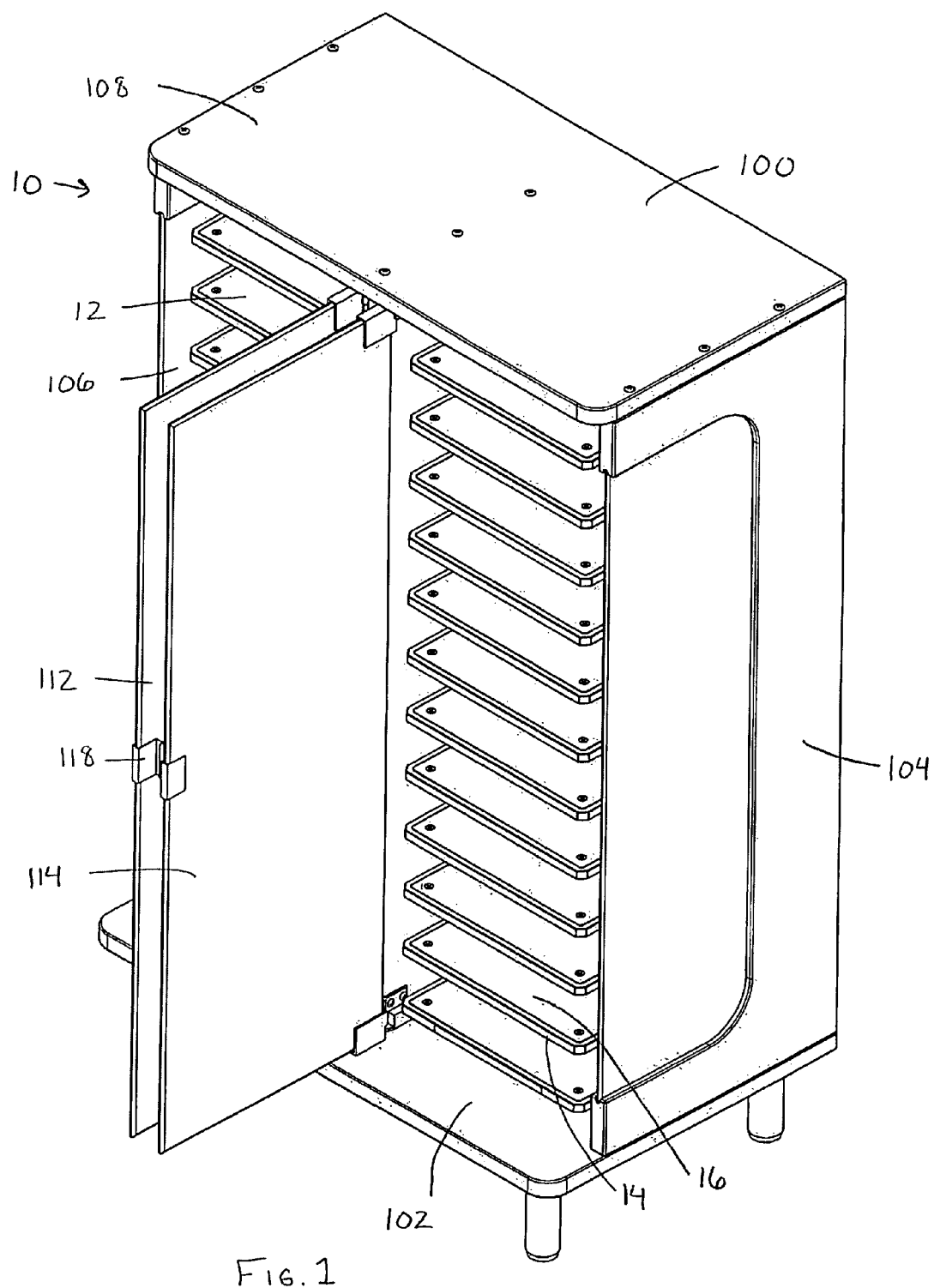
FIG. 1 is a perspective view of a thermal cabinet according to one embodiment of the present invention.

A thermal cabinet appliance designed to heat, re-heat or re-thermalize food products is shown in FIG. 1, and generally designated 10. In the illustrated embodiment, the appliance or device 10 has multiple shelves or trays 12 arranged in multiple levels. In one embodiment, each tray includes a tray mount frame 14, and an upper 16 and lower 18 plate—typically made of metal. Each tray 12 may also include a heater 20 and a temperature sensor 22. The device 10 may additionally include a controller, or a plurality of controllers, configured to operate the heaters 20 to heat and hold a food product at a desired temperature for a desired time period.

II. Structure

Figure 2:
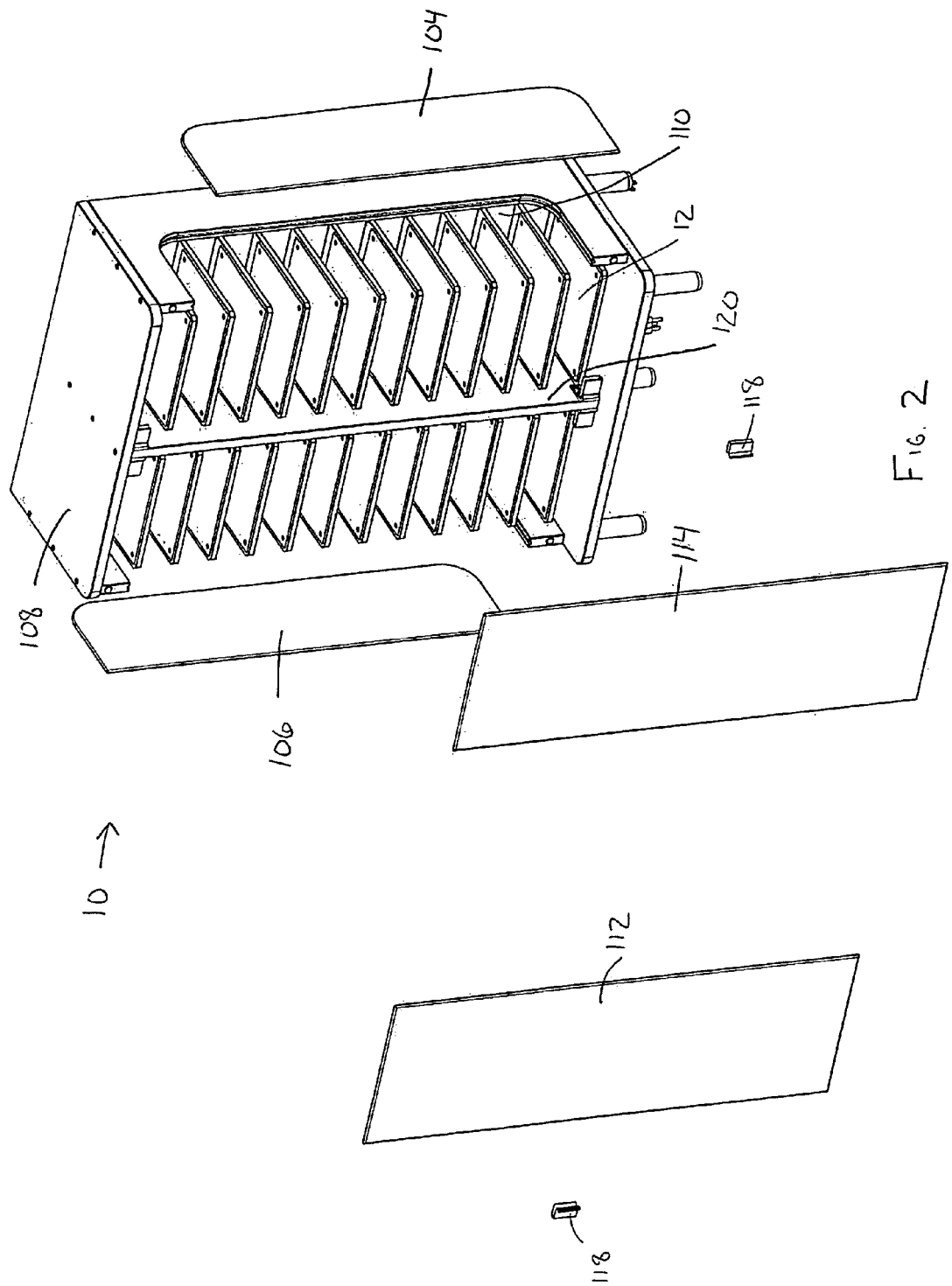
FIG. 2 is an exploded perspective view of the cabinet.

As shown in FIG. 1, in one embodiment, the cabinet 10 includes a housing 100 for supporting the trays 12. As illustrated in FIGS. 1 and 2, the housing 100 includes a floor 102, side panels 104, 106, a top panel 108, rear panel 110 and a pair of doors 112, 114. The housing 100 may be constructed of variety of materials, including a thermoplastic material, a cellulose and/or resin-based product or metallic material. The doors 112, 114 may be mounted between the top panel 108 and the floor 102 such that they can swing outwardly to provide access to the trays 12. Each door may include a handle 118 to facilitate opening the door. In one embodiment, the trays 12 are mounted horizontally to the rear panel 110 in a cantilever fashion, and they are arranged in two side-by-side columns within the housing 100, with a divider panel 120 between them. A typical cabinet 10 may have three or more trays 12 mounted horizontally and stacked in columns with spacing between of 1.5 inches to 5 inches vertically; however, the arrangement of the trays 12 may vary from application to application as desired. For instance, the trays may be arranged in a single column, or in a single row, or they may each be oriented vertically or at an angle within the housing 100. In another alternative embodiment, the housing 100 may be a simple support element, such as a single wall or arm for supporting the trays 12. Uses for a product/appliance of this nature include, but are not limited to: convenience stores, theaters, senior centers, schools, dormitories, sporting events, conventions, carnivals, break rooms and lunch areas, personal and group residences. The cabinet 10 constructed to mount the tray assemblies as well as house controls (not shown) can vary in size, shape and color.

Figure 3:
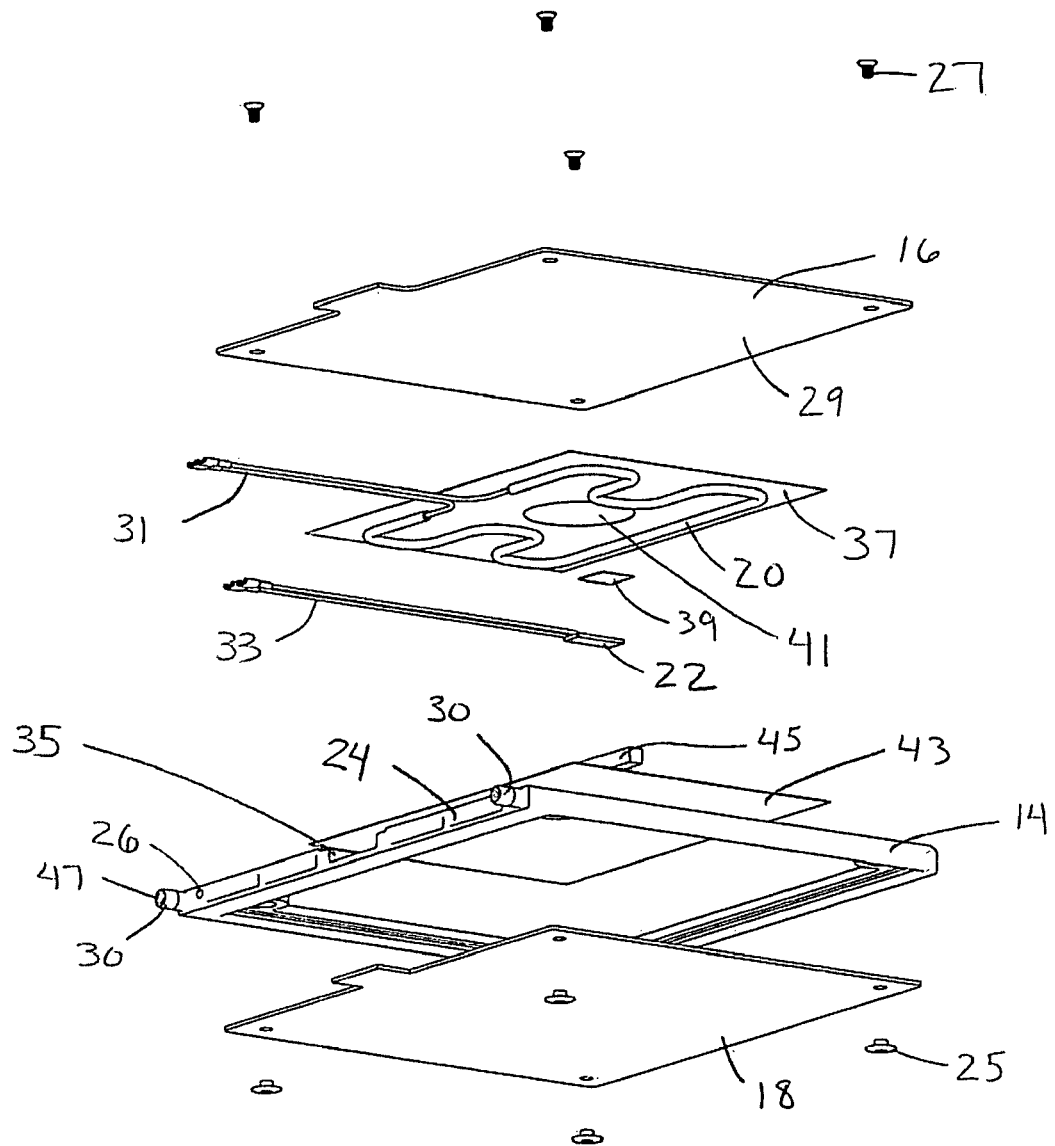
FIG. 3 is an exploded view of a tray according to one embodiment.

In one embodiment, the trays 12 each include a heater 20, a temperature sensor 22 and a controller 23. Referring to FIG. 3, in the illustrated embodiment, each tray 12 includes an upper plate 16, a lower plate 18, a heater 20, a frame 14 and a thermistor 22. The upper and lower plates 16, 18 are typically steel or another metal, but may be formed from a variety of materials. As shown, the plates are positioned on opposite sides of the frame 14, which in one embodiment is a plastic piece. The top and bottom plate 16, 18 are fastened together in each corner with a portion of the frame 14 sandwiched between using fasteners 25 and 27. In one embodiment, the plastic frame size is larger than the plates 16, 18, and is formed to fit the steel plates 16, 18, for instance, with a peripheral groove on the top and bottom surfaces that allows the plates and the items assembled to them to fit inside the thickness of the plastic. As shown, three of the four sides of the plastic frame 14 have rounded edges. The fourth side 24 is the side that is used to mount the plastic frame to a surface. As illustrated, the fourth side 24 of the frame 14 has several features. At either end of the fourth side 24 is a boss 30 of plastic which extends out from the edge 24 perpendicular to the edge. At the end of the boss 30 is a hole 47 in which a light can be placed. In this embodiment, at least a portion of the frame 14 is transparent or translucent, so the light from the light source can be projected through the frame 14. This edge 24 may also include holes 26 for a self threading screw, or another fastener, that extends through the fourth side 24 of the frame 14 to attach the frame to a surface as described below. In the illustrated embodiment, the screw holes 26 are perpendicular to the mounting edge 24 and are centered so that the length of the mounting screw that self threads into the hole is allowed to extend between the plates as described further below.

Referring to FIGS. 2-4, in one embodiment, the frame 14 is attached to a surface, such as the rear panel 110 of the housing 100 in a cantilevered fashion by one of its sides or edges 24. As illustrated, the side 24 of the frame 14 is attached using screws 51 which thread into the holes 26 in the frame 14. In one embodiment, the holes 26 are positioned on the frame 14 so that the center of the screw 51 is centered within the gap between the upper 16 and lower 18 plates when they are fastened to the frame 14. As a result, the screws that hold the frame on the rear panel 110 extend into the gap between the two plates. The gap between the plates 16, 18 may be such that it is smaller that the outer diameter of the screw. In this embodiment, the threads of the screw 51 cut into the underside 29 of the top plate 16 and the upper side of the lower plate 18. If present, the threads will cut away the coating on the plates' surface so that the screw and the top 16 and bottom 18 plate have electrical continuity. This continuity may be used to supply an earth ground to the upper 16 and lower 18 plates by way of the screw to an earth grounded vertical surface. As illustrated, each frame 14 is attached to the rear panel 110 utilizing two screws 51 and this grounding method is used in both locations so as to ensure the upper 16 and lower 18 plates are grounded appropriately. A series of wires may 53 extend from each of the screws 51 to the ground.

As shown, the heater 20 is positioned between the two plates, and is attached to the inside surface 29 on the upper plate 16. In the illustrated embodiment, heater 20 is a generally conventional wire heater, and as shown it is arranged in an H-shaped pattern on a layer of foil 37 that is adhered to the upper plate 16. Other known types of heaters may be used, depending on the desired application. Situated centered and attached to the upper plate 16 and surrounded by the heater 20 is a temperature sensing device, which in the illustrated embodiment is a thermistor 22. As illustrated, the thermistor 22 is attached to an isolation pad 39, which is attached directly to the upper plate 16 through a hole 41 in the foil 37. A heat insulating layer, such as fish paper 43, may be attached over the heater 20 and thermistor 22, and a foam pad 45 may be attached between the fish paper 43 and the thermistor 22 to reinforce the thermistor 22 against the upper plate 16. In this arrangement, the thermistor 22 provides accurate measurements—via resistance changes—of the temperature of the tray 12, and, in particular, the temperature of the surface of the upper plate 16. Alternative temperature sensing devices may otherwise be used to measure the temperature of the upper plate 16, such as a thermocouple. A set of coated wires 33 from the thermistor 22 and the an additional set of leads 31 from the heater may extend through a hole 35 in the edge of the plastic frame.

In yet another embodiment, a temperature sensing device may be included that directly measures the temperature of the food product placed on top of the upper plate 16. For instance, a non-contacting temperature probe such as a thermal imaging or other infrared device may be utilized to monitor the temperature of a food product or pre-packaged item on the tray 12. Alternately, a non-contacting probe may be used in conjunction with a thermistor, thermocouple, bi-metal based or other temperature sensing device located on the heating surface to measure the temperature difference between the item and the heating surface.

The individual heating surfaces, such as the upper plates 16 or other portions of the trays 12, may additionally contain a strain gauge, proximity sensor, through-beam element, microswitch or other similar element, either contacting or non-contacting, to detect the presence of an item on the individual tray. A strain gauge can be employed on an individual surface can be utilized to measure the mass of the item or items placed on it and adjust the equilibrium state time period. Further, as noted above, the individual heating surfaces 16, if metallic, can be grounded through contact with a conventional sheet metal or other screw-type fastener for enhanced safety. The device 10 can contain a circuit breaker, fuse, fusible link, or other means of protection for the unit in the case of a ground-fault or short circuit.

In one embodiment, the cabinet 10 includes a controller 23 for measuring and maintaining the heating surface temperatures, particularly the surface temperature of the upper plate 16. In the illustrated embodiment, the controller 23 includes a plurality of individual circuit boards 55, with one circuit board 55 connected to each tray 12. More particularly, as shown in FIG. 4, the cabinet 10 includes a plurality of circuit boards 55 mounted on the rear panel 110 of the housing 100, with each circuit board 55 positioned on the rear panel 110 opposite one of the trays 12. The screws 51 for attaching the trays 12 may extend through each circuit board 55 to secure the circuit board to the rear panel 110 and the tray 12. Each circuit board may include a receptacle 57 for receiving the heater wires 31 and a receptacle 59 for receiving the thermistor wires 33 for forming an electrical connection between the heater 20 and the circuit board 55 and between the thermistor 22 and the circuit board 55 (FIG. 4 shows the wires 31, 33 unconnected to the receptacles 57, 59 respectively). The circuit boards 55 may each additionally include an LED (or another light source) connected to the circuit board that extends through the rear panel 110 and into the holes 47 in the bosses 30 of the frame 14 described above. In one embodiment, each tray 12 has a red LED and a blue LED to indicate the status of the tray to the user. Other light signals or audible signals may also be used. A removable cover (not shown) may be placed over the rear of the housing 100 so the circuit boards are easily serviceable or replaceable. In another embodiment, the device 10 may include another known controller or plurality of controllers, which may be electrically coupled to one or more of the heaters and temperature sensors and programmed or otherwise configured to communicate with and control the heaters and temperature sensors.

Figure 15:
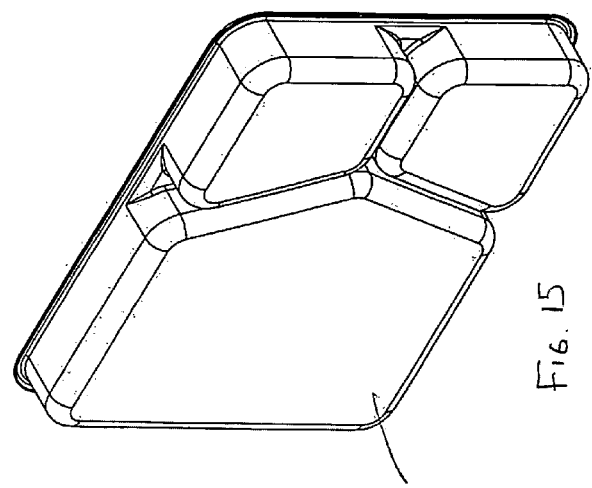
FIG. 15 is another rear perspective view of the tray of FIG. 13
Figure 13:
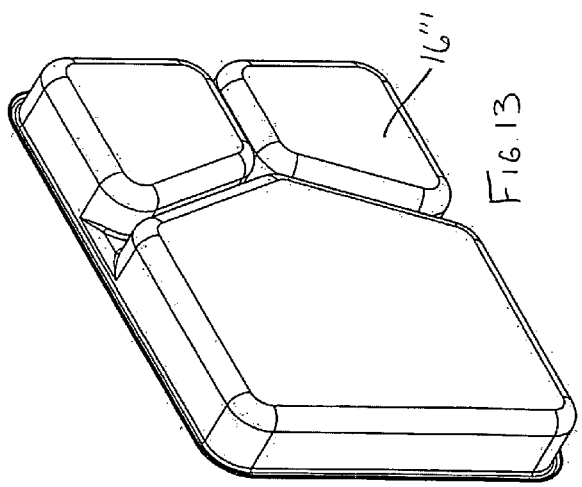
FIG. 13 is a rear perspective view of tray for placement on one of the trays.
Figure 14:
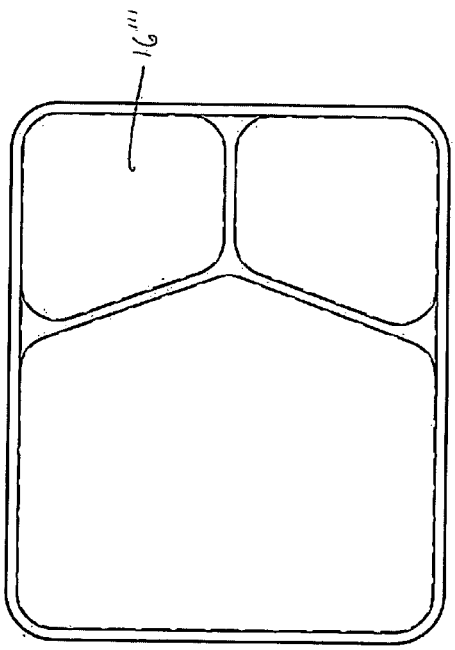
FIG. 14 is top view of the tray of FIG. 13.
Figure 19:
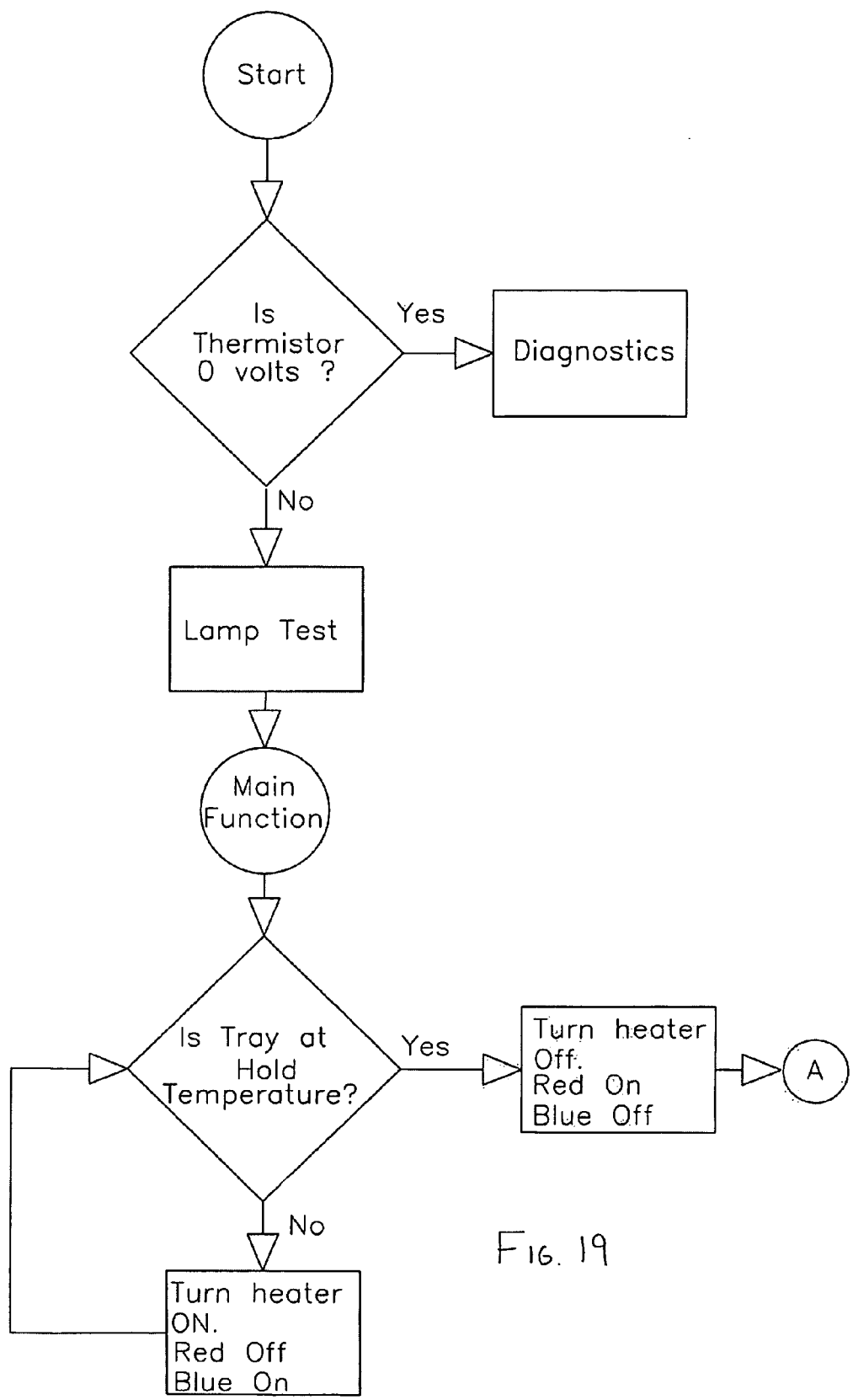
FIG. 19 is a flow chart of a first portion of a method for controlling the operation of a tray.
Figure 20:
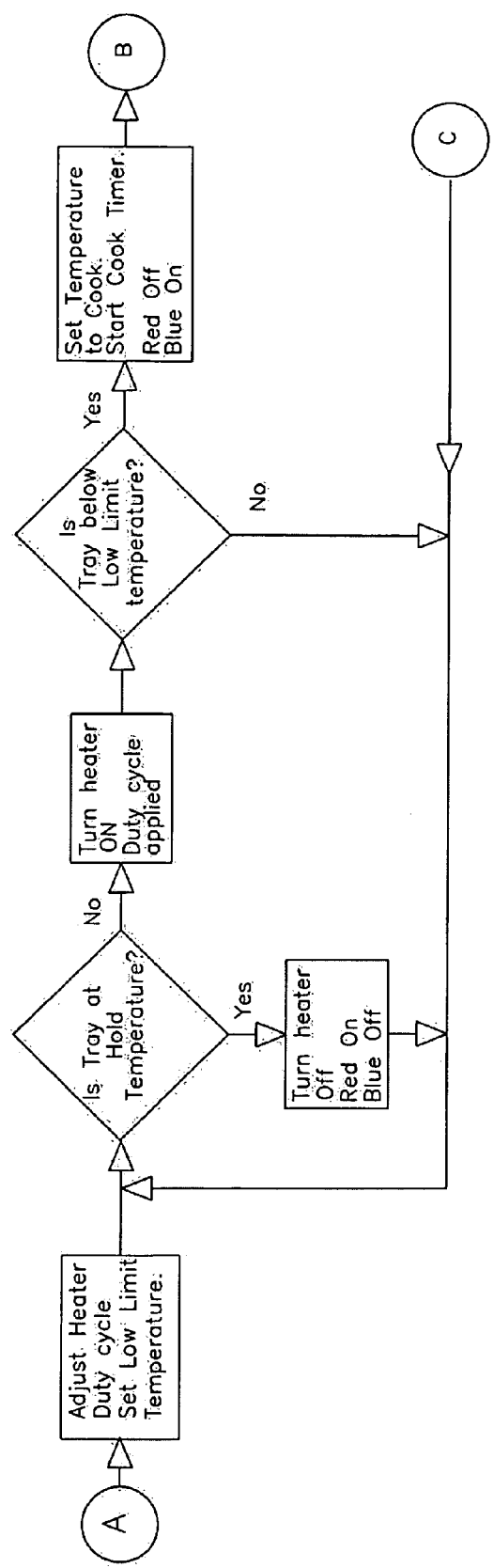
FIG. 20 is a flow chart of a second portion of a method for controlling the operation of a tray.
Figure 21:
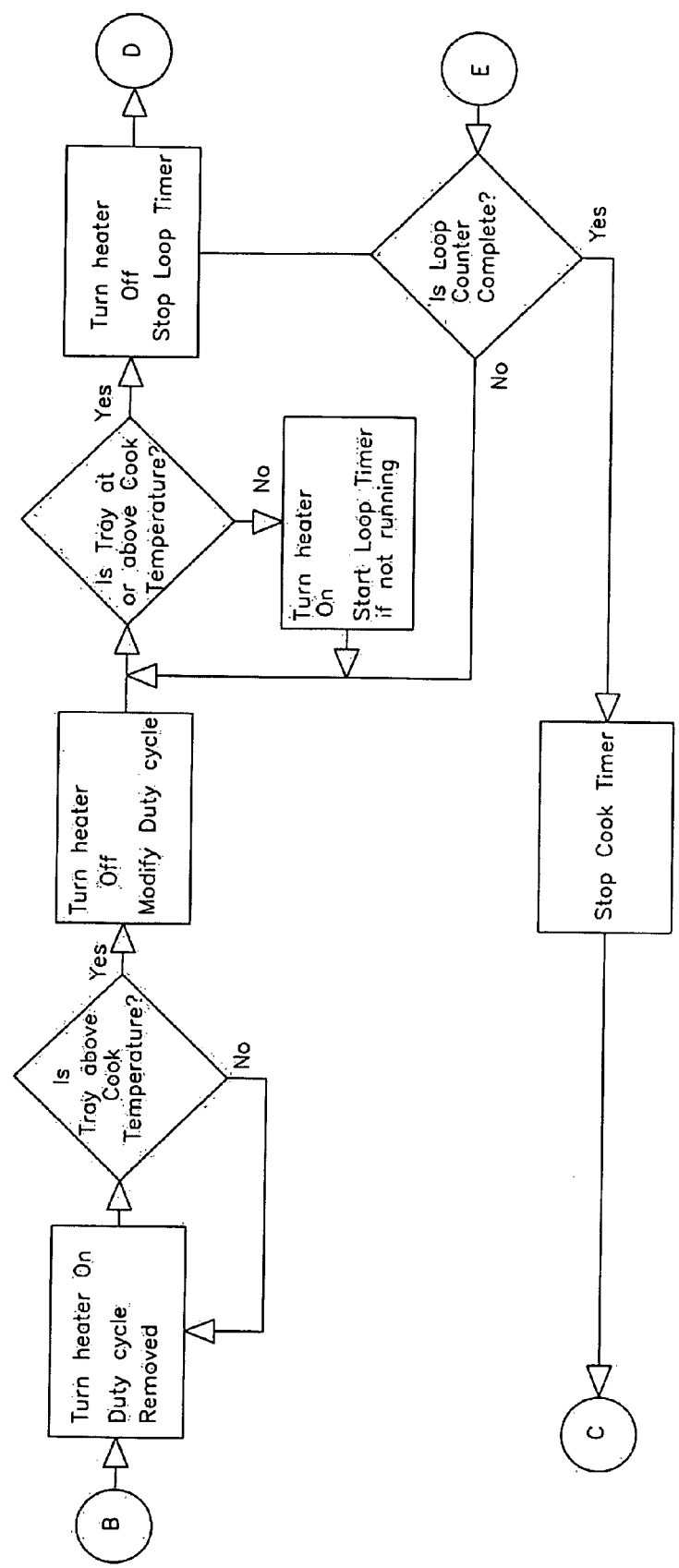
FIG. 21 is a flow chart of a third portion of a method for controlling the operation of a tray.
Figure 22:
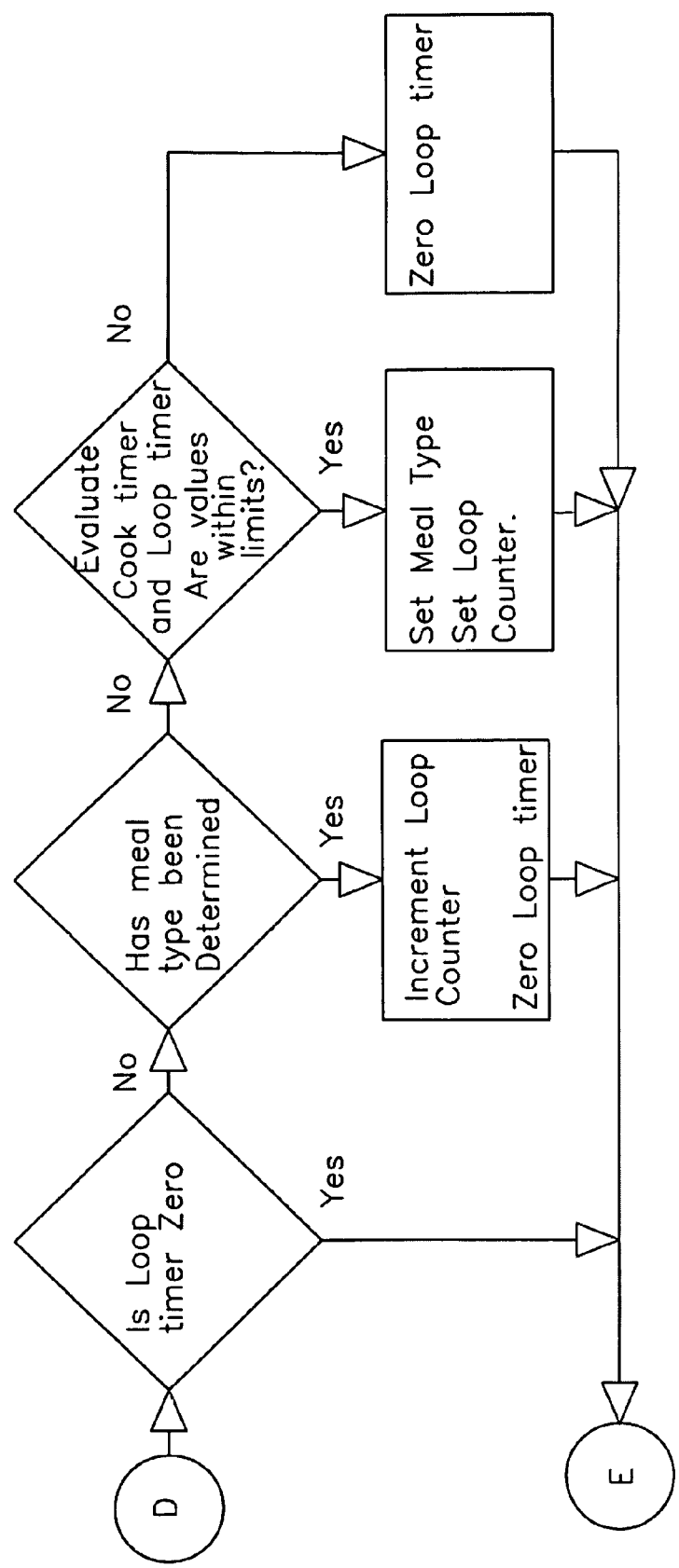
FIG. 22 is a flow chart of a fourth portion of a method for controlling the operation of a tray.

In an alternative embodiment, one or more of the trays may have a surface that is designed to correspond to the shape of a particular food product. FIGS. 5-8 illustrate an embodiment wherein the upper plate 16' includes a divider 200 for holding and retaining particular types of food products in smaller sections of the tray 16'. The dividers could be even more specifically formed to match a food product, for instance, by molding or otherwise forming the upper plate 16' or a portion thereof into the shape of the food product. In a similar embodiment, shown in FIGS. 9-12, an attachment tray 16" may be provided to snap-fit, or otherwise attach, to the tray 12. The attachment tray 16", may also include a divider 200', or it may be shaped to match the shape of another food product. In yet another embodiment, shown in FIGS. 13-15, a separate food tray 16'" may be provided for holding the food product.

In another alternative embodiment, one or more of the trays could be cup-shaped, or otherwise shaped to correspond to the shape of a food product. FIGS. 16-17 illustrate one such embodiment, wherein the tray 212 is shaped as a half-cup in order to receive cup-shaped food products 214, such as pre-packaged soup containers. The tray 212 surrounds a larger surface area on the cup-shaped container 214 to help improve the efficiency in heating such a container. The tray 212 may include a heater, temperature sensor and controller similar to those described above. In one embodiment, a dispenser 216 is provided above the tray 212, such that after a cup-shaped container 214 has been removed, another container 214 can automatically be placed in the tray 212. This arrangement may be beneficial in a retail environment, wherein a plurality of pre-packaged food products for purchase can be automatically heated and replaced. Another, similar arrangement is shown in FIG. 18, wherein the half-cup shaped tray 212' is provided in connection with a generally horizontal dispenser 218, which may gravity feed or spring-load the containers to advance a subsequent container into the tray 212' when a container is removed. The unit 10 may also include a means for repositioning the food products from the heating surface area to a more accessible position for final removal. Such an arrangement may include a wire rack similar to one found in an oven or dishwasher that includes a home storage position.

In yet another embodiment, the unit 10 can be constructed so as to include an individual shelf status remote notification feature, to remotely signal to a user that an item has been satisfactorily heated, which can be especially useful in an office environment. For example, the controller may be configured to communicate with a network server to send a message to an individual when the food product on a particular tray is completely heated, such as an email message or other signal. The device may also employ a real-time camera to allow for closed circuit, intranet, Internet, satellite, wireless or hand-held device-based viewing of the unit 10 to observe individual food item status, cabinet content, restocking need and/or selections available without requiring an individual's physical presence.

III. Method of Operation

The cabinet 10 may include an algorithm designed to operate one or more of the trays 12 such that after holding food at a pathogenically safe temperature for a predetermined extended period of time, generally measured in multiple hours, an indicator may be provided for each heating surface designed to notify either the consumer or the individual responsible for the health and well being of a prospective consumer of the food items to dispose of the food item present on the individual surface. Such an algorithm may contain a self-resetting feature after the item is replaced. A flow chart illustrating an embodiment of the function of the controller 23 for operation of one or more individual trays 12 is shown in FIGS. 19-22. In this embodiment, when the device 10 is first turned on (for instance, by plugging the device 10 into a power source), the tray does a lamp test for a programmed number of seconds. Both the red and blue lights light up to ensure that no lights have failed. Next, the controller may operate the heater 20 to warm the tray to a programmed holding temperature. In one embodiment, the holding temperature is between 140 and 190 deg F., and in a more particular embodiment the holding temperature is 175 deg F. As the tray heats, its light is blue and the heater 20 is allowed to use 100% heater power.

When the tray 12 reaches its holding temperature, the tray light switches to red, indicating that the tray 12 is warmed up to holding temperature and ready to receive a food item. At this point, the user is free to load product on the tray 12 for warming. When the tray 12 reaches its holding temperature, the controller 23 operates the heater 20 to run on a duty cycle, such that heater 20 is allowed to only use a portion of its full power to maintain the upper plate 16 of the tray at the holding temperature. In one embodiment, the tray operates at 33% of full power in this duty cycle (66% for the lowest tray), for instance, by cycling between on for 1 second and off for 2 seconds. Also, a low limit temperature or trigger temperature is also set in the controller at approximately 2 to 10 degrees F. below the holding temperature.

When a cold food product is placed on the tray 12, the heater 20 is unable to maintain its hold temperature due to the reduced duty cycle. The cold product thus draws the tray temperature (as measured by the thermistor 22) down until it falls below the low limit trigger temperature. This initiates the heater 20 to change into a "rethermalization" cycle. At this point, the tray lights switch from red to blue to indicate that the product is being heated, and the heater 20 is operated at 100% of the available heater wattage to reach a cook temperature. In one embodiment, the cook temperature is about 210 degrees F. The controller 23 also starts a cook timer that measures the amount of time that it takes to raise the temperature of the tray to the cook temperature. This timer may be used later to make decisions as to how long the tray has been in the "cook" mode and also used to determine if the heater has been on for too long, which indicates a burned out heater fuse or heater.

When the temperature sensor 22 indicates that the tray has reached the cook temperature, the heater 20 is turned off, and the heater 20 is then operated on another duty cycle. In one embodiment, this second duty cycle uses 90% of the heater power. When the tray temperature falls below its cook temperature (as a result of turning off the heater), the heater is turned on using the second, 90% duty cycle. At the same time, the controller starts another timer, called the loop timer which measures the amount of time it takes the tray 12 to get back to the cook temperature using the 90% duty cycle.

When the tray 12 gets back up to the cook temperature using the 90% duty cycle, the controller 23 evaluates the cook timer and the loop timer to determine its next function and how long to cook the food product. In particular, the controller determines how many times to repeatedly cycle through the previous step of turning off the heater and then raising the tray temperature back to the cook temperature using the 90% duty cycle. In one embodiment, the first timer evaluated is the loop timer. It needs to be below 160 seconds before any cook times can be determined. If it is above 160 seconds, the controller ignores the value and initiates the heater to operate on another 90% duty cycle, waiting for the next loop time to register. When the loop timer is below 160 seconds, the controller 23 evaluates the cook timer value. If the cook timer value is below 3000 seconds, the meal type is set to 1. If it is above 3000 the meal type is 2. In one embodiment, a type 1 meal requires that the loop timer cycle ten times below 160 seconds, and a type 2 meal requires that the loop timer cycles five times below 160. Of course, additional food types could be entered into the controller to accommodate and more accurately cook different types of food. The various food types may be calculated or determined by testing various varieties of foods and foods of varying sizes.

When the tray 12 has completed the required number of loop timer cycles, the meal is considered heated. At this point, the controller 23 switches the light on the tray to red, or provides another signal to indicate that the status has changed. In one embodiment, the controller 23 then sets the tray temperature to the hold temperature of 175, or another hold temperature, and operates the heater on a hold heater duty cycle. The hold heater duty cycle may be the same as the first duty cycle, wherein the power of the heater is reduced to 33%. The heated food product on the tray now acts much like a heat battery, and can be maintained at the hold temperature until the user is ready to remove and consume the food product. In one embodiment, the hold temperature of the tray, and, more particularly, the upper plate 16 of the tray, is set at approximately between 140 deg F. and 190 deg F. This temperature is low enough to not make the moisture that is in the food item to evaporate, and is high enough to allow the food item to be maintained at this temperature for extended periods of time without degrading the pathogenic safety of the food product. In the embodiment including a remote notification feature, the controller 23 may then signal to the network server, or another communication link, that the food product on that particular tray has been heated, and the server may send a message to the user.

The above noted method is one way of heating a food product and holding it at the desired hold temperature as a function of the temperature of the tray, and as a function of the particular food product that has been placed on the tray (via the loop timer and cook timer). Alternative heating and holding methods may also be used, including using the tray temperature, cook timer, loop timer, and other parameters, such as the actual measured temperature of the food product. The method may be employed into a single tray or multiple trays. In one embodiment, different methods, such as different cook times, could be set for different shelves based on their location within the housing 100. For instance, the trays 12 in one column could be configured to heat one type of food products, and the trays 12 could be configured to heat a second type of food products, or to maintain a particular temperature in already warmed products.

Figure 23:
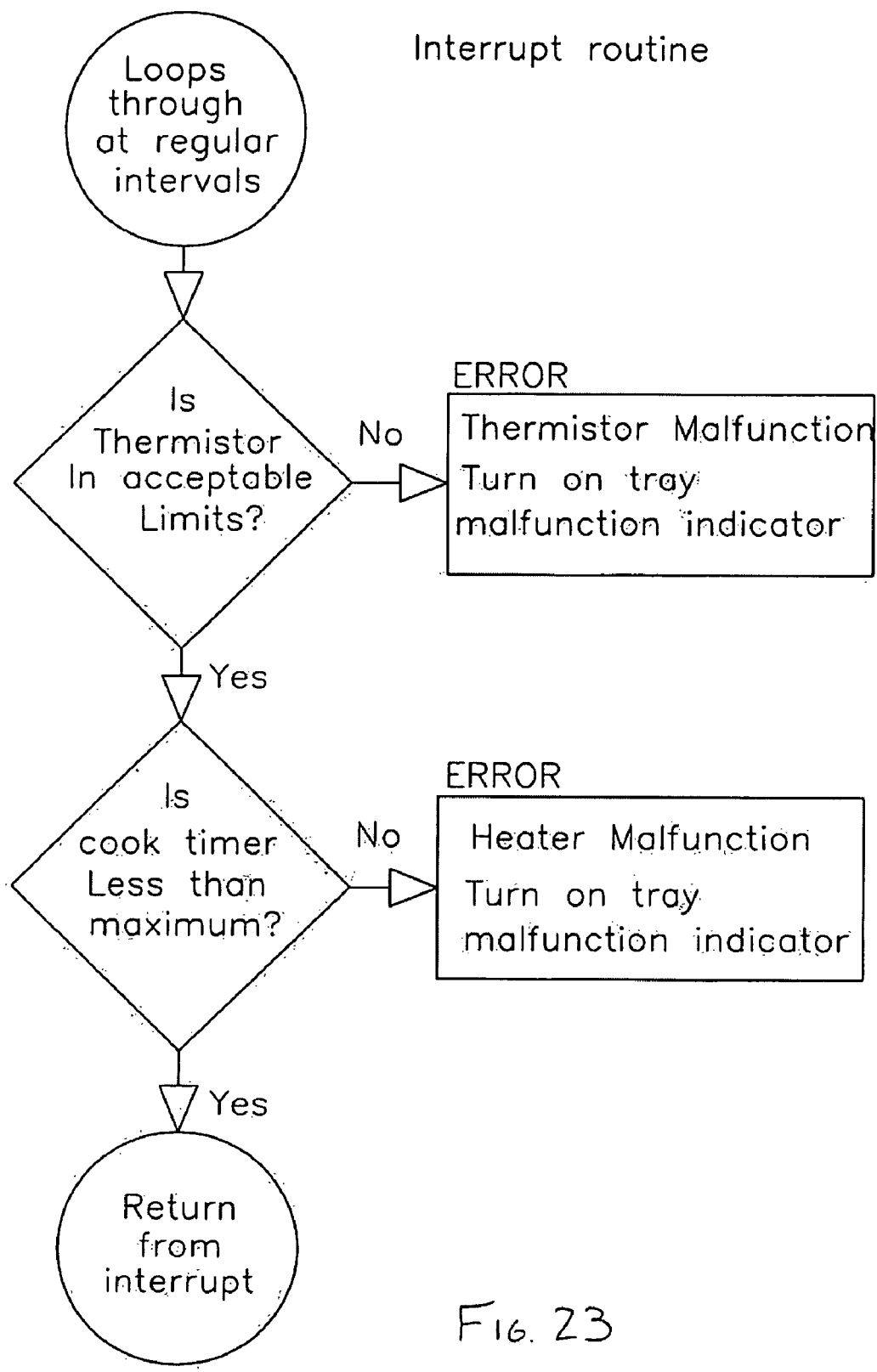
FIG. 23 is a flow chart of an error loop.

Referring now to FIG. 23, in yet another embodiment, the device may contain an algorithm and means for detecting power failure during use and provide an indicator if power is lost for a pathogenically unsafe period of time after which the food items must be disposed. A means for resetting the optional power failure indication feature by the individual responsible for the health and well being of a prospective consumer of the food items is provided. The controller 23 may also be configured to determine if the temperature sensor has malfunctioned. In one such embodiment, the controller is configured to routinely check that the thermistor voltage is within a desired range. In one embodiment, this range is set to 0.3 to 3.5 volts. If the thermistor value is out of this range, the controller locks into an error mode, and produces a signal to indicate the error. In one embodiment, the red light turns off and the blue light flashes indicating the error. In another embodiment, the controller will also flash the blue light if the heater has been on for greater than 3 hours, which is an indication that the heater fuse or other circuit protection has burned out or the heater has failed. These features help insure that the tray is functioning properly and that food served off from the tray is up to a safe serving temperature. The tray can be reset out of this mode by cycling the power. If the failure is still present at power down, the controller will signal an error for that tray again after the power is cycled.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property of privilege is claimed are defined as follows:

1. A device for heating food comprising:
   a housing;
   a plurality of trays supported on said housing, each of said trays including a heater and a temperature sensor associated with said tray, said heater operable to heat said tray, said temperature sensor capable of sensing the temperature of said tray; and
   a controller electrically coupled to each of said heaters and each of said temperature sensors, wherein said controller automatically determines an amount of time to operate said heater to heat food on said tray, said controller including a timer capable of measuring a first time period, wherein said first time period is an amount of time to raise said tray temperature to a predetermined cook temperature value, said controller configured to operate said heater to heat said tray for a second time period that is greater than said first time period, wherein the duration of said second time period is determined as a function of said tray temperature and said first time period, said controller configured to operate said heater on a first duty cycle to maintain said tray temperature at a hold temperature, wherein said first duty cycle utilizes less power than said operation of said heater to heat said tray for said second time period, said controller configured to automatically deactivate said first duty cycle and operate said heater on a rethermalization cycle to raise said tray temperature to a cook temperature when said tray temperature falls below a lower limit temperature, said controller configured to automatically deactivate said rethermalization cycle and to operate said heater on a second duty cycle when said tray temperature reaches said cook temperature, wherein said first time period measured by said controller is a cook time that is measured during said rethermalization cycle, said controller further configured to measure a loop time during said second duty cycle.

2. The device of claim 1 wherein said controller is configured to restart said heater on said second duty cycle a plurality of times as a function of said cook time and said loop time as measured by said controller.

3. The device of claim 2 wherein said tray includes a frame extending around a periphery of at least a portion of said frame, and an indicator mounted within said frame, and wherein said controller is configured to activate said indicator upon completion of said second duty cycle.

4. The device of claim 3 wherein said controller is further configured to remotely communicate the completion of said second duty cycle.

* * * * *